March 26, 1940. G. S. BRAUN 2,194,845
TEMPERATURE INDICATOR FOR ELECTRICAL APPLIANCES
Filed Feb. 2, 1938
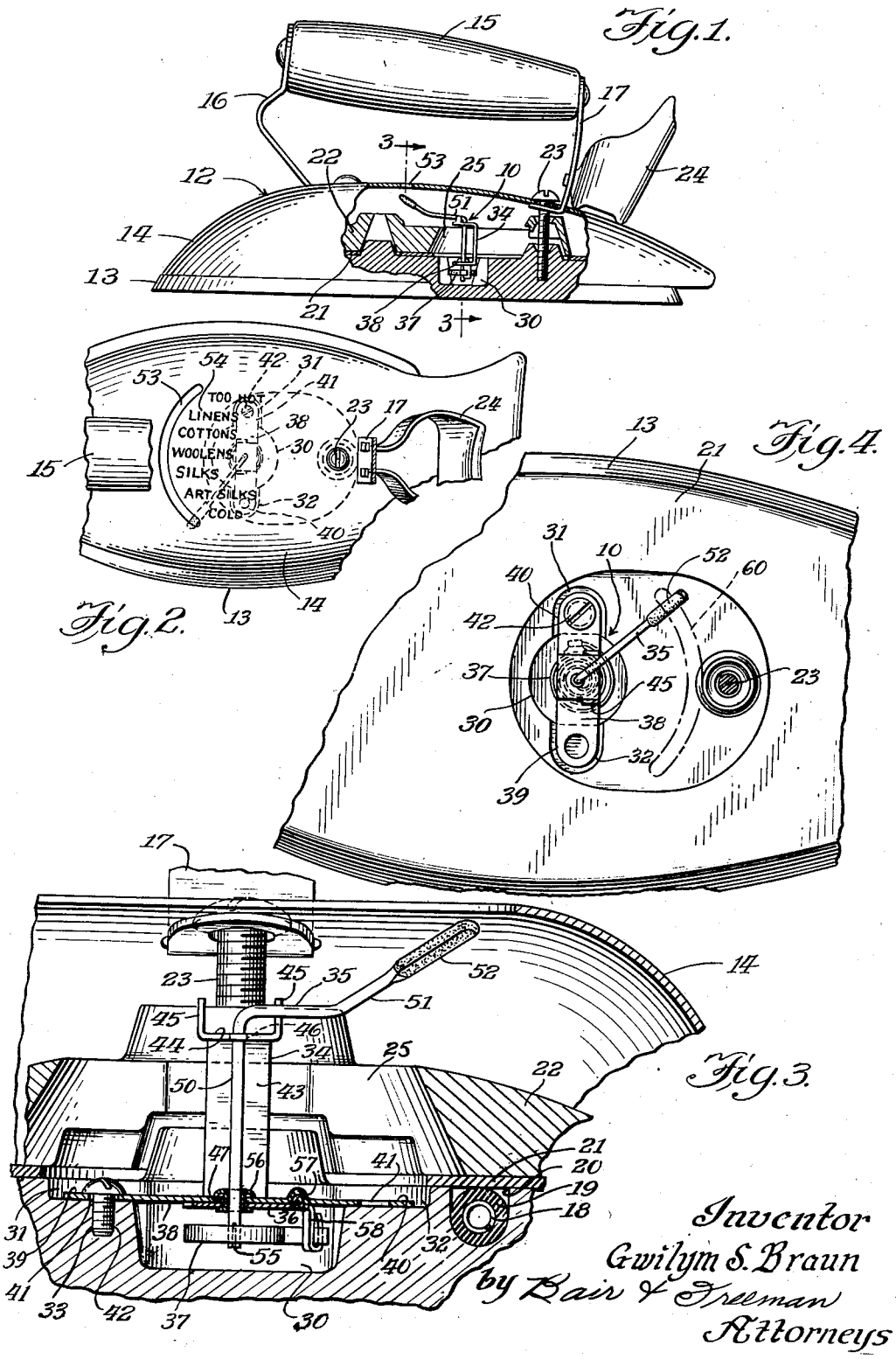
Inventor
Gwilym S. Braun
by Bair & Freeman
Attorneys Patented Mar. 26, 1940

2,194,845

UNITED STATES PATENT OFFICE 2,194,845

TEMPERATURE INDICATOR FOR ELECTRICAL APPLIANCES

Gwilym S. Braun, Strasburg, Ohio, assignor to Knapp-Monarch Company, St. Louis, Mo., a corporation of Missouri Application February 2, 1938, Serial No. 188,293

8 Claims. (Cl. 73—343)

My invention relates to electric appliances particularly to heat indicators therefor. Among the objects of my invention is the provision of a new and improved heat indicator for an electric appliance which is simple in construction and inexpensive to manufacture.

Another object is to provide a new and improved heat indicator for electric appliances which is attached to the appliance in any of a plurality of positions without change in the construction of any of the parts in order that it may function properly with casings therefor of different design which may be used alternatively with a standard appliance when supplied to different customers.

Another object is the provision of a heat indicator for electric appliances of simple and rigid design, sensitive, and capable of accurately indicating actual temperature conditions in a hot plate in said appliance.

Still another object is the provision of a heat indicator for a sad iron which has the thermostatic element embedded in a space provided for it in the sole plate so that it will receive the full effect of heat applied to the iron, an added object, in cases where electric heat is used, being the embedding of the thermostatic element in said space in order to be surrounded and directly affected by an electric heating element also embedded in said plate so that the indicator is quick acting and sensitive to sudden changes in temperature in the iron.

A further object is the provision in a sad iron of a heat indicator of such simple design that the frame therefor, constructed from a single piece of metal, is operable to support an indicator member and limit its movement, to support a thermal element in operative position thereon and to provide means of a simple character making it possible to mount the device in more than one accurately set position upon the sole plate of the iron.

A still further object is to provide a heat indicator for attachment to a sad iron which can be constructed by use of a minimum number of parts wherein a frame and a swinging indicator member are each respectively constructed of a single piece, the frame being adapted to support and limit the swinging action of the indicator member and provide a bracket for supporting a thermal element secured to the frame in such a manner that an aperture is provided at the point of attachment operable additionally as a bearing for the lower end of the indicator member, said bracket being attached at a second point by a simple manufacturing operation featuring the punching of a projection on one into a depression on the other.

Still a further object is to provide a heat indicating device for attachment to a mounting prepared for it on a sad iron which is constructed of a minimum number of parts and in such a manner that the procedure necessary to assemble the indicator upon the sad iron is reduced to a single operation characterized by the insertion and tightening of a solitary screw, a pair of oppositely disposed apertures being provided on the indicator so that it can be reversed in its mounting and there secured by the same solitary screw used in directly mounting the device thereby rendering unnecessary any change in the design of the parts or the assembly operation.

Another object is the provision of a new and improved indicating device for a sad iron wherein a space provided for the reception of a thermostatic element operating the device is located as near as possible to the ironing surface so that the temperature recorded thereby will be substantially that of the sad iron surface actually in contact with a garment to be ironed.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a sad iron partially in section showing my device.

Figure 2 is a fragmentary top view of the sad iron showing my device in dotted position.

Figure 3 is an enlarged cross sectional view taken on line 3—3 of Figure 1 looking in the direction of the arrows.

Figure 4 is an enlarged top view of the interior of a sad iron showing the device mounted in reversed position.

Although the invention is susceptible of a variety of embodiments, applicable to a variety of appliances wherein electric heating elements are used, it is unnecessary to fully describe and illustrate more than one type in order to give a full understanding of the principle of invention both from its structural and functional standpoints. Accordingly, I have illustrated a preferred and desirable embodiment of the invention functioning with a sad iron in the accompanying drawing forming a part of this specification and throughout the views of which like reference characters refer to the same parts.

In the construction of sad irons as in the manufacture of various other articles sold in a highly competitive market, small changes in design and novel means of simplifying the construction of the device, have a material advantage by reason of permitting a reduction in manufacturing costs to a point which will give an appreciable measure of advantage over competitors. Devices of this character having already been reduced by a process of improvements to a point where construction approaches the bare essentials, any changes for their betterment or greater simplification necessitates the exercise of considerable ingenuity and changes which do not always effect radical alterations in design frequently are extremely valuable and appreciated by those skilled in the art.

Having in mind therefore the simplification of a heat indicating device and its attachment to appliances such as a sad iron by a rapid assembly operation, a heat indicator device generally designated by the numeral 10 has been devised and is shown in this embodiment incorporated in a sad iron of the type suitable for ordinary household use, generally designated by the numeral 12. The sad iron so chosen is an electric iron including a hot plate 13, which in the manufacture of sad irons is customarily termed a sole plate, a casing or shell 14 and a handle 15 supported by brackets 16 and 17. Embedded in the sole plate is a heating element 18 of the conventional sort surrounded by a mass of insulating cement 19 received together with the element in a groove 20. Attached to the sole plate is a cover 21 for the heating element and above this is a weight 22 having in it an aperture 25 to permit insertion and removal of the heat indicating device. A screw 23 inserted through a suitable aperture in the shell fastens the shell together with the weight securely upon the sole plate so that the entire apparatus is held together as a single unit. A guard 24 is provided to protect the electric terminals for the heating element (not shown).

Within the sole plate is formed a well 30 somewhat circular in shape and joined at each side by shallow recesses 31 and 32, but only the recess 31 is provided with a tapped hole designated by the numeral 33.

The heat indicator device generally designated 10 consists of essentially four elements, namely, a frame 34, an indicating member 35, a bracket 36 and a thermostatic element 37.

The frame is made from a single stamping and consists of a base 38 usually set crosswise in the iron having laterally extending supporting plates or parts 39 and 40 receivable respectively in the recesses 31 and 32. These laterally extending parts have formed in each identical apertures 41 exactly the same in size and positioned the same distance from a common center. The frame is shown secured in place in the sad iron by means of a solitary screw 42 inserted in the aperture 41 of the laterally extending part 39, and the frame once secured in place, is prevented from rotating out of position by the walls of the opposite recess 32 holding the laterally extending part 40 in place.

An upright portion 43 extends upward from the base and has at the top a flat plate 44 which is provided at each side with upward extending projections 45. There is a bearing aperture 46 in the top plate and another bearing aperture 47 in the base.

The indicating member 35 is made from a single piece of wire and consists of a vertical rod portion 50 bent at right angles at the top to form a pointer 51 which in this disclosure is shown tipped with a phosphorescent material 52. The indicating member is designed to swing or rotate freely within the bearing apertures 46 and 47 through an arc which is limited in extent by contact of the base of the pointer against the projections 45. There is an arcuate slot 53 in the shell through which the phosphorescent tipped portion 52 is visible and on the shell is a visible scale 54 which in this disclosure contains words which indicate the preferable heat for different material which may be ironed.

The thermostatic element 37 is here shown in the form of a bi-metallic helical coil with the inner end of the spiral inserted in a slot 55 formed at the lower end of the rod 50 of the indicator member which is pinched over the thermostatic material to hold it in place. The bracket 36 is riveted to the base 38 by means of a hollow rivet 56 which forms at the same time a reinforced lining for the lower bearing aperture in which the indicating arm rotates. This being the only point at which the bracket 36 is secured to the base, means to prevent it from accidental rotation is supplied by an interlocking engagement 57 formed by a projection in the bracket punched into a depression formed in the base by the force of the impact. There is a downward extending angle portion 58 on the bracket which is looped around the outer end of the thermostatic element to hold it securely in position. It will be noted that the thermostatic element is located within the well 30 formed in the sole plate which itself is completely surrounded by coils of the electric heating element. It will be apparent that the thickness of the sole plate between the bottom of the well and the ironing surface is relatively thin, a construction which is instrumental in sustaining the element at a temperature substantially equivalent to the temperature of the ironing surface where it contacts a garment which is being ironed.

A significant feature of the device is that it may be reversed end for end without necessitating any change in construction. The laterally extending part 40 at one side of the base containing the aperture 41 shown unused in the recess 32 in Figure 3 can be reversed and inserted in the recess 31 and there secured by means of the screw 42 inserted in the aperture. This change will completely reverse the position of the heat indicator in the sad iron as shown in Figure 4. Such a procedure becomes desirable when a shell of different design is to be supplied, intended to give a completely different appearance to the iron as a whole. The accompanying mechanical change is accomplished by placing an arcuate slot 60, similar to the slot 53, in the shell curving toward the rear of the sad iron. Therefore without change in the construction of any of the parts and without any change whatever in the assembly set-up the position of the heat indicator in the iron can be completely reversed without a single extra operation in order to accommodate a shell of completely different design.

Some changes may be made in the construction and arrangement of the various parts of my device, without departing from the real spirit and purpose of my invention, and it is my intention to cover by my claims, any modified forms of structure, or use of mechanical equivalents, which may be reasonably included within their scope.

I claim as my invention:

1. A heat indicator for an electric appliance having a hot plate formed with a well and a plurality of shallow recesses therein, a supporting frame including a base provided with extensions extending into said recesses and securable to said plate selectively in one of a plurality of positions, an upright portion and a top plate provided with a bearing aperture, an indicating member on said frame including a pointer and an upright rod portion journaled in said aperture and having a lower end extending through the base, an angle bracket and a hollow rivet for riveting said bracket to the base adapted to form in the base a rotatable support for the lower end of the rod, said bracket being prevented from rotating out of position with respect to said base by an interlocked engagement of adjacent portions of said bracket and said base, and a coil of thermostatic bi-metal secured at its inside end to the rod and at its outside end to a portion of said bracket.

2. A heat indicator for an electric appliance including a hot plate having a well therein and recesses adjacent thereto, a supporting frame including a base provided with extensions extending into said recesses for securing the base to the hot plate selectively in one of a plurality of positions, an upright portion and a top plate provided with an aperture, an indicating member on the frame including a pointer and an upright rod portion journaled in said aperture having a slotted lower end positioned in the well, an angle bracket and a hollow rivet for securing said bracket to the base forming in the base a rotatable support for the lower end of the rod, said bracket being prevented from rotating out of position with respect to said base by a locked engagement of adjacent portions of said bracket and said base, and a coil of thermostatic bi-metal suspended in the well secured at its inside end to the slotted end of the rod and at its outside end to a hooked portion of said bracket.

3. In a heat indicator for an electric appliance having a hot plate with an attaching element thereon, the combination of a frame made from a single stamping including a horizontal base provided with a plurality of apertured extensions alternatively attachable to said element, a bearing aperture in said base, a vertical portion bent upright from said base, a horizontal top plate bent at right angles to the vertical portion provided with a bearing aperture and a pair of projections bent upwards at the sides of the top plate to serve as stops, an indicating member provided with a pointer journaled in the bearing apertures of the frame and a thermostatic element secured to the frame for actuating the indicating member between said stops.

4. In a heat indicator for an electric appliance having a hot plate provided with a well and a plurality of shallow recesses at the sides thereof, the combination of a frame made from a single stamping including a base provided with extensions extending into said recesses for securing the bracket to the hot plate selectively in one of a plurality of positions, a bearing aperture in said base, an upright portion bent at right angles to the base, a horizontal top plate bent at right angles to the upright portion provided with a bearing aperture and a pair of projections bent upward at the sides of said top plate, an indicating member including an upright rod portion provided with a slot at the lower end journaled in said bearing apertures and a pointer bent from said rod extending swingably between the projections to stop position thereagainst, an angle bracket riveted to the base at the bearing aperture and prevented from rotating out of position with respect to said base by an interlocking engagement between adjacent parts of said bracket and said base, and a coil of thermostatic bi-metal secured at one end in said slot and at the other end to a portion of said bracket.

5. In a sad iron having a replaceable shell and a sole plate including a well therein, a pair of shallow recesses at the sides of the well and a threaded aperture in one of said recesses, a heat indicator comprising a supporting frame made from a single stamping including a flat horizontal base provided with a pair of apertured extensions receivable in said recesses selectively in one of a plurality of positions, a central bearing aperture in the base, an upright portion, a flat horizontal top plate parallel to said base provided with a bearing aperture and a pair of upstanding projections at the sides of said top plate, an indicating member mounted on the frame formed from a single piece including an upright rod portion rotatably journaled in said apertures bent at the upper end at an angle to form a pointer extending swingably from side to side between the projections into lateral stop positions thereagainst, said rod having a slot at the lower end, an angle bracket secured to the base at the bearing aperture and prevented from rotating out of position by an interlocked engagement between adjacent portions of said angle and said base, a coil of thermostatic bi-metal pinched in said slot at one end and supported at the other end by said bracket, and a visible scale on the shell cooperable with the pointer.

6. A heat indicator for a sad iron having a replaceable shell and a sole plate adapted to be heated formed with a well and a pair of shallow recesses therein at the sides of the well, a threaded aperture in one of said recesses, a supporting frame made from a single stamping including a flat horizontal base provided with a pair of apertured extensions adapted to be fastened by a single screw in said recesses in one of a plurality of positions, means forming a bearing aperture in said base, an upright portion, a flat horizontal top plate parallel to said base provided with a bearing aperture and a pair of upstanding projections at the sides of said plate, an indicating member formed from a single piece including an upright rod portion journaled in said apertures having an upper portion thereof bent into the form of a pointer operable simultaneously to support the rod upon the upper plate, said pointer extending swingably from side to side between the projections to stop positions thereagainst and having a lower slotted portion extending below the base into the well, an angle bracket in said well riveted to the under side of the base at the bearing aperture and prevented from rotating out of position with respect to said base by an interlocked engagement between adjacent portions of said bracket and said base, a coil of thermostatic bi-metal positioned in said well below the base having one end thereof secured in the slotted end of the rod and the other end attached to the bracket, and a visible scale on the shell cooperable with the pointer.

7. A heat indicator for an electric appliance, said appliance including a hot plate provided with a well and oppositely positioned recesses adjacent said well, the combination of a frame comprising an upright member projecting a substantial distance above the well and a base member covering the well and having laterally extending arms seated in said recesses and means for securing the arms in the recesses, an indicating member comprising an elongated bar journaled in said base and upright member of the frame and projecting above the frame and into the well, a bracket fixedly attached to said base and extending into the well, and a thermostatic coil positioned in the well and attached to said indicating member and said bracket.

8. A heat indicator for an electric appliance, said appliance including a hot plate provided with a well, oppositely positioned recesses adjacent said well, and a casing provided with a window offset from the well, the combination of a frame comprising an upright member projecting a substantial distance above the well and a base member covering the well and having laterally extending arms seated in said recesses, means for securing either of said arms in one of said recesses so that said arms may be secured selectively in either of said recesses, an indicating member comprising an elongated bar journaled in said base and upright member of the frame, and projecting at one end into the well and at the other end to a position opposite said window, and a thermostatic coil positioned in the well and attached at one end to said indicating member and means for securing the other end of said coil.

GWILYM S. BRAUN.